US009369438B2

(12) United States Patent
Harrison et al.

(10) Patent No.: US 9,369,438 B2
(45) Date of Patent: Jun. 14, 2016

(54) SUPERVISED DATA TRANSFER

(75) Inventors: Henry Noel Arnold Harrison, Guildford (GB); Brenton Shane Cooper, Mawson Lakes (AU); Jason Ross Westmacott, Mawson Lakes (AU)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/118,423

(22) PCT Filed: May 21, 2012

(86) PCT No.: PCT/GB2012/051145
§ 371 (c)(1),
(2), (4) Date: Nov. 18, 2013

(87) PCT Pub. No.: WO2012/160366
PCT Pub. Date: Nov. 29, 2012

(65) Prior Publication Data
US 2014/0101750 A1    Apr. 10, 2014

(30) Foreign Application Priority Data

May 20, 2011 (EP) ..................................... 11275083
May 20, 2011 (GB) .................................... 1108461.3

(51) Int. Cl.
*H04L 29/06* (2006.01)
(52) U.S. Cl.
CPC ........ *H04L 63/0281* (2013.01); *H04L 63/1416* (2013.01); *H04L 63/1441* (2013.01)
(58) Field of Classification Search
CPC ............ H04L 63/0281; H04L 63/1416; H04L 63/1441
USPC ........ 713/193, 189; 726/12; 380/28, 268, 279
See application file for complete search history.

(56) References Cited

U.S. PATENT DOCUMENTS 6,233,618 B1 * 5/2001 Shannon ........... G06F 17/30887
707/999.01
6,351,817 B1 * 2/2002 Flyntz ..................... G06F 21/32
380/202

(Continued)

FOREIGN PATENT DOCUMENTS

WO    WO 2004/028107 A2    4/2004
WO    WO 2006/131744 A1    12/2006

(Continued)

OTHER PUBLICATIONS

Cheng, Feng et al., "Lock-Keeper Technology—A New Network Security Solution", retrieved from the internet: URL:http://www.informatik.uni-trier.de/meinel/papers/LockKeeper_Preprint_03_05.pdf (retrieved on Oct. 21, 2005).

(Continued)

*Primary Examiner* — David García Cervetti
(74) *Attorney, Agent, or Firm* — Scully, Scott, Murphy & Presser, PC

(57) ABSTRACT

An apparatus and method are provided for controlling a transfer of data between data communications networks. In a preferred implementation, an apparatus is provided comprising: a data store; computer providing, in a first computing environment, a first network interface for accessing a first data communications network and a first user interface for receiving a first data transfer request to download data from a data source linked to the first data communications network to the data store; computer providing, in a second computing environment isolated from the first computing environment, a second network interface for accessing a second data communications network and a second user interface for receiving a second data transfer request to transfer downloaded data from the data store to a recipient device linked to the second data communications network; and data transfer controller with access to resources in both the first and second computing environments for controlling downloads and transfers of data according to the first and second requests, further comprising a supervisory controller arranged to determine, prior to implementing the second request, that at least the second request originates from a human user.

32 Claims, 4 Drawing Sheets

(56) References Cited

U.S. PATENT DOCUMENTS

| | | | | |
|---|---|---|---|---|
| 6,678,828 B1* | 1/2004 | Pham | G06F 3/0622 | 726/2 |
| 7,610,329 B2* | 10/2009 | Bone | G06F 17/30067 | 707/999.002 |
| RE41,168 E* | 3/2010 | Shannon | G06F 17/30887 | 709/225 |
| 7,760,722 B1 | 7/2010 | Tripathi et al. | | |
| 8,020,108 B1* | 9/2011 | Roytman | H04L 67/1097 | 709/223 |
| 8,428,063 B2* | 4/2013 | Salinger | H04L 12/2801 | 370/235 |
| 8,473,336 B1* | 6/2013 | Simmons | G06Q 30/00 | 705/14.1 |
| 8,584,225 B1* | 11/2013 | Kennedy | H04L 67/34 | 726/10 |
| 2002/0065868 A1* | 5/2002 | Lunsford | H04L 12/5692 | 709/200 |
| 2002/0156915 A1* | 10/2002 | Haggar | H04L 29/12009 | 709/238 |
| 2002/0178410 A1* | 11/2002 | Haitsma | G06F 17/30787 | 714/709 |
| 2003/0031150 A1* | 2/2003 | Yukie | H04L 12/5692 | 370/338 |
| 2004/0249974 A1* | 12/2004 | Alkhatib | H04L 29/12349 | 709/245 |
| 2005/0144441 A1 | 6/2005 | Govindarajan | | |
| 2005/0216664 A1* | 9/2005 | Taninaka | G06F 3/0622 | 711/114 |
| 2007/0067497 A1* | 3/2007 | Craft | H04L 69/32 | 709/250 |
| 2008/0211668 A1* | 9/2008 | Dixon | B65D 90/00 | 340/541 |
| 2008/0295175 A1 | 11/2008 | Ansari et al. | | |
| 2008/0298643 A1* | 12/2008 | Lawther | G06F 17/30256 | 382/118 |
| 2008/0320554 A1* | 12/2008 | Baker | G06F 21/31 | 726/2 |
| 2009/0094311 A1 | 4/2009 | Awadallah et al. | | |
| 2009/0193503 A1* | 7/2009 | Shevehenko | H04L 63/0272 | 726/4 |
| 2009/0260068 A1* | 10/2009 | Hariharan | H04L 9/32 | 726/7 |
| 2010/0063830 A1* | 3/2010 | Kenedy | G06Q 50/22 | 705/2 |
| 2010/0063835 A1* | 3/2010 | Kenedy | G06F 19/28 | 705/2 |
| 2010/0063865 A1* | 3/2010 | Kenedy | G06Q 30/08 | 705/7.29 |
| 2010/0070292 A1* | 3/2010 | Kenedy | G06Q 20/102 | 705/2 |
| 2010/0070600 A1* | 3/2010 | Schulzrinne | G06F 17/30864 | 709/206 |
| 2010/0076950 A1* | 3/2010 | Kenedy | G06Q 30/02 | 707/706 |
| 2010/0076988 A1* | 3/2010 | Kenedy | G06Q 30/02 | 707/757 |
| 2010/0150408 A1* | 6/2010 | Ishikawa | G06K 9/00288 | 382/118 |
| 2010/0250712 A1* | 9/2010 | Ellison | H04L 41/0233 | 709/219 |
| 2010/0312676 A1* | 12/2010 | Muthukumaran | G06Q 20/40 | 705/30 |
| 2011/0007983 A1* | 1/2011 | Cho, II | G06K 9/00241 | 382/260 |
| 2011/0019920 A1* | 1/2011 | Hu | G06K 9/00261 | 382/195 |
| 2011/0029587 A1* | 2/2011 | Fujii | G06F 17/30144 | 707/827 |
| 2011/0113147 A1* | 5/2011 | Poluri | G06F 21/31 | 709/229 |
| 2011/0141124 A1* | 6/2011 | Halls | G06F 21/83 | 345/522 |
| 2011/0225233 A1* | 9/2011 | Casalaina | G06F 17/30528 | 709/203 |
| 2012/0054834 A1* | 3/2012 | King | G06F 21/31 | 726/4 |
| 2012/0166748 A1* | 6/2012 | Satoyama | G06F 3/0608 | 711/165 |
| 2013/0057685 A1* | 3/2013 | Roskowski | H04N 5/76 | 348/143 |

FOREIGN PATENT DOCUMENTS

| | | |
|---|---|---|
| WO | WO 2008/004248 A1 | 1/2008 |
| WO | WO 2008/068450 A2 | 6/2008 |

OTHER PUBLICATIONS

International Search Report and Written Opinion dated Aug. 6, 2012 issued in PCT/GB2012/051145.
Extended European Search Report dated Sep. 12, 2011 issued in EP 11275083.1.
UK Search Report dated Sep. 2, 2011 issued in GB1108461.3.
International Report on Patentability and Written Opinion dated Nov. 28, 2013 from PCT/GB2012/051145.
Zaiane, et al., WEBKDD 2002—Mining Web Data for Discovering Usage, Patterns and Profiles: 4th International Workshop, Edmonton, Canada, Jul. 23, 2002, Revised Papers, abstract.
Shi et al, "Implicit Authentication through Learning User Behavior", 13th International Conference on Information Security (ISC2010) Oct. 25-28, 2010, pp. 1-16.
Srivastava et al., "Web Usage Mining: Discovery and Applications of Usage Patterns from Web Data", SIGKDD Explorations, Copyright 1999 ACM SIGKDD, Jan. 2000, Vol. 2, Issue 2, pp. 1-10.

* cited by examiner

SUPERVISED DATA TRANSFER

This invention relates to data transfer between networks and in particular, but not exclusively, to digital data transfer between physical or virtual networks or environments under at least partially automated supervision and intervention.

It is known to deploy a network gateway between a first and a second network to provide an interface between the different networks, for example where they operate using different network protocols. The network gateway may be used to control the transfer of data from a data source linked to one network, the public internet for example, to a data recipient linked to the other network, a corporate network for example. The network gateway may be implemented in general purpose computing hardware and software, or as a more specialised device such as a router. Conveniently, the gateway may execute software to provide conventional firewall functionality in an attempt to prevent certain types of data entering the corporate network. The gateway may also implement more sophisticated checks on data, for example relating to its content or to the identity of the data source, blocking data transfers which fail any of the checks applied.

However, hardware and software alone are not always sufficient to determine whether movement of data from one network to another should be permitted or prevented. Ultimately, a human user may need to make a decision as to whether initially to request and then to permit the transfer of data, with any associated risks, from a named data source to a recipient computing device under the user's control. What is needed is an appropriate level of automated support to enable the human level decision making process to proceed, but with a reduced risk of it being compromised.

From a first aspect, the present invention resides in an apparatus for controlling a transfer of data between data communications networks, the apparatus comprising:

a data store;

computing means providing, in a first computing environment, a first network interface for accessing a first data communications network and a first user interface for receiving a first data transfer request to download data from a data source linked to the first data communications network to the data store;

computing means providing, in a second computing environment isolated from the first computing environment, a second network interface for accessing a second data communications network and a second user interface for receiving a second data transfer request to transfer downloaded data from the data store to a recipient device linked to the second data communications network; and data transfer control means with access to resources in both the first and second computing environments for controlling downloads and transfers of data according to the first and second requests, further comprising supervisory means arranged to determine, prior to implementing the second request, that at least the second request originates from a human user.

Various advantageous implementations of the apparatus have been devised. In one preferred embodiment, at least one of the first and second networks is a virtual network.

In a further preferred embodiment, the first and second computing environments are implemented using separate physical computing devices such that there is no direct data link between the first and the second computing environments and the data transfer control means, including the supervisory means, are implemented within either a secure computing environment on the second physical computing device, or on a third physical computing device arranged with access to resources on the first and second computing devices, inaccessible from the first and second computing environments.

As an alternative to a distributed arrangement, the first and second computing environments may be implemented as distinct virtual computing environments hosted on a single physical computing device, and the data transfer control means, including the supervisory means, are implemented in a third computing environment hosted on the same physical computing device, the third computing environment being inaccessible from the first and second virtual computing environments.

In such arrangements, appropriate levels of security may be achieved between the different computing environments so that the possibilities for attack by rogue users or software are reduced.

In a preferred application of the apparatus from this first aspect, the apparatus may further comprise file regeneration means for regenerating a file of a predetermined format, downloaded to the data store, using content selected from the file, and wherein the data transfer control means are arranged to make the regenerated file available for transfer to or access over the second network and, upon request, and subject to validation by the supervisory means, to enable access to the downloaded file in the second network.

From a second aspect, the present invention resides in an apparatus for accessing data over a data communications network, the apparatus comprising:

computing means providing, in a first computing environment, a network interface to the data communications network and a first user interface for receiving a first data transfer request to download data from a data source linked to the network to a data store accessible in the first computing environment and, in a second computing environment isolated from the first computing environment, a second user interface for receiving a second data transfer request to access data downloaded to the data store;

data transfer control means with access to resources in both the first and second computing environments for controlling the download of and access to data according to the first and second requests, further comprising supervisory means arranged to determine, prior to implementing the second request, that at least the second request originates from a human user.

From this second aspect, data transfer and access control may be achieved from a single computing device, e.g. a user terminal device. In one preferred arrangement, the first and second computing environments may comprise distinct virtual computing environments provided on a user terminal computing device and the data transfer control means, including the supervisory means, are implemented in a third computing environment provided on the user terminal device, inaccessible from the first and second virtual computing environments.

In preferred embodiments from either the first or the second aspect of the present invention, various techniques have been devised for verifying the presence of a human user or for identifying non-human behaviour. In a preferred embodiment, the supervisory means are arranged to determine a probability that the first request or the second request originates from other than a human user and, in the event that the determined probability exceeds a predetermined threshold, to trigger one or more actions selected from:

at the second user interface, requesting a response designed to identify a user as a legitimate human user;

storing, in a log, details of a respective first or second request and an indication of the basis for recognising a non-human request to transfer data;

communicating, to a supervisory user, details of the first or second request and an indication of the basis for recognising a non-human request to transfer data; and indicating, at the second user interface, that the second request has been denied and terminating the respective transfer of data.

In one preferred technique, a first or second request by other than a human user is indicated when it is found to be statistically inconsistent, on the basis of one or more metrics derived from historical data transfer requests, with data characterising human behaviour. Such metrics may be computed from data characterising data transfer activity by the apparatus over a given time period. In particular, the one or more metrics are computed from time series data characterising data transfer activity at the apparatus over a given time period and the supervisory means are arranged to compare the one or more metrics calculated from time series data characterising data transfer requests attributable to a user over a time period t with respective metrics calculated from time series data characterising data transfer requests attributable to the user, or data transfer requests of other users, over a longer time period T in order to detect divergent, non-human behaviour. The time series data characterising data transfer requests attributable to the user over a time period t may include data characterising a current first or second request attributed to the user.

Preferably, data characterising data transfer requests attributable to a user include at least one type of data selected from:

data representative of the content of data that was the subject of a data transfer request;

the time at which each of a first or second request was made;

the claimed identity of a user attributed to a request to transfer data;

the type of data indicated by a first or second request; and metadata indicative of the type of software operating on the computing device or in the computing environment from where a first or second request was initiated.

By collecting such data, various checks and comparisons can be performed designed to identify discrepancies and inconsistencies that may be indicative both of human and non-human data transfer requests, leading to those metrics that can be used to distinguish data transfer requests by other than human users, for example those generated automatically by rogue software.

From a third aspect, the present invention resides in a system for accessing, from a first network, data stored on a second network, the system comprising one or more user terminal devices arranged with access to gateway device comprising an apparatus according to the first aspect of the present invention, the user terminal device comprising:

a first computing environment;

a second computing environment inaccessible from the first computing environment;

a third computing environment inaccessible from the first and the second computing environments but arranged with access to one or more resources accessible to the first and second computing environments, provided with human user validation means arranged to communicate over a secure communications link to data transfer control means of the gateway device; and a network interface, configured to provide access to the first network from the first environment and to the second network from the second environment, wherein a user with access to the first environment is arranged to communicate with a first user interface of the gateway device to request a download to the gateway device of data over the first network, and a user with access to the second environment is arranged to communicate with a second user interface of the gateway device to request a transfer of downloaded data from the gateway device over the second network, and wherein the human user validation means are responsive to signals from the gateway device to implement at least a portion of a human user validation procedure at the user terminal device.

The first and second computing environments preferably comprise virtual computing environments provided within the third computing environment.

From a fourth aspect, the present invention resides in a method for controlling the transfer of data between a data source linked to a first data communications network and a recipient computing device linked to a second data communications network, comprising the steps:

(i) at a first user interface, receiving a first request to download data from the data source to an intermediate device over the first network;

(ii) at a second user interface, receiving a second request to transfer data downloaded to the intermediate device to the recipient computing device over the second network; and (iii) performing a supervisory step, prior to implementing the second request to transfer data over the second network, to determine that at least the second request originates from a human user.

In a preferred approach, step (iii) comprises determining a probability that the first request or the second request originates from other than a human user, the method further comprising the step:

(iv) in the event that the determined probability at step (iii) exceeds a predetermined threshold, of triggering one or more actions selected from:

at the second user interface, requesting entry of information designed to identify a user as a legitimate human user;

storing, in a log, details of a respective first or second data transfer request and an indication of the basis for recognising a non-human request to transfer data;

communicating, to a supervisory user, details of the first or second data transfer request and an indication of the basis for recognising a non-human request to transfer data; and indicating, at the second user interface, that the second request has been denied and terminating the respective transfer of data.

Among preferred techniques for identifying non-human activity, a data transfer request or a series of data transfer requests by other than a human user is or are indicated when it is or they are found, at the supervisory step (iii), to be statistically inconsistent, on the basis of one or more metrics derived from historical data transfer requests, with data characterising human behaviour. The one or more metrics may be computed from data characterising data transfer activity over a given time period. In particular, the one or more metrics may be computed from time series data characterising data transfer activity over a given time period and wherein, at the supervisory step (iii), the probability is determined by comparing said one or more metrics calculated from time series data characterising data transfer requests attributable to a user over a time period t with respective metrics calculated from time series data characterising data transfer requests attributable to the user, or data transfer requests of other users, over a longer time period T to thereby calculate a probability of divergent, non-human behaviour. The time series data characterising data transfer requests attributable to the user over a time period t may include data characterising a current first or second data transfer request attributable to the user.

As above, the data characterising data transfer activity attributable to the user may include at least one type of data selected from:

data representative of the content of data that was the subject of a data transfer request;

the time at which each of a first or second data transfer request was made;

the claimed identity of a user attributed to a request to transfer data;

the type of data indicated by a first or second data transfer request; and metadata indicative of the type of software operating on a computing device or in a computing environment from where a data transfer request was initiated.

In order to reduce the level of false alarm in the detection of non-human data transfer requests, preferably a feedback step may be implemented by which a supervisory or administrative user may confirm or amend a result by the supervisory step (iii) to thereby modify calculations performed in respect of a particular user or in respect of particular operating conditions associated with that user.

A direct approach to validating the presence of a human user preferably comprises the step, in the event that the determined probability exceeds a predetermined threshold, issuing, by means of the second user interface, a challenge-response test designed to elicit an incorrect response if by other than a human user.

Preferably, in the event that the determined probability exceeds a predetermined threshold, a challenge-response test may be issued, by means of the second user interface, designed to elicit an incorrect response if by other than a human user. The challenge-response test may be a "CAPTCHA" (Completely Automated Public Turing test to tell Computers and Humans Apart) request or other form of Turing test, or it may be a request for entry of data provided by a device believed to be in the sole possession of the user (as used to implement two-factor authentication).

From a fifth aspect, the present invention resides in a computer program product comprising one or more executable software modules which when loaded and executed on a general purpose computer, or upon a distributed arrangement of computers, is arranged to implement the method according to that defined from the fourth aspect of the present invention, above.

From a sixth aspect, the present invention resides in a data carrier comprising a computer-readable medium having stored thereon software code means which when loaded and executed on a general purpose computer, or upon a distributed arrangement of computers, are arranged to implement the method steps as defined according to the fourth aspect of the present invention.

From a seventh aspect, the present invention resides in a computer, or distributed arrangement of computers, having loaded thereon a computer program product according to the fifth aspect of the present invention.

Preferred embodiments of the present invention will now be described in more detail, by way of example only, with reference to the accompanying drawings of which:

Figure 1:
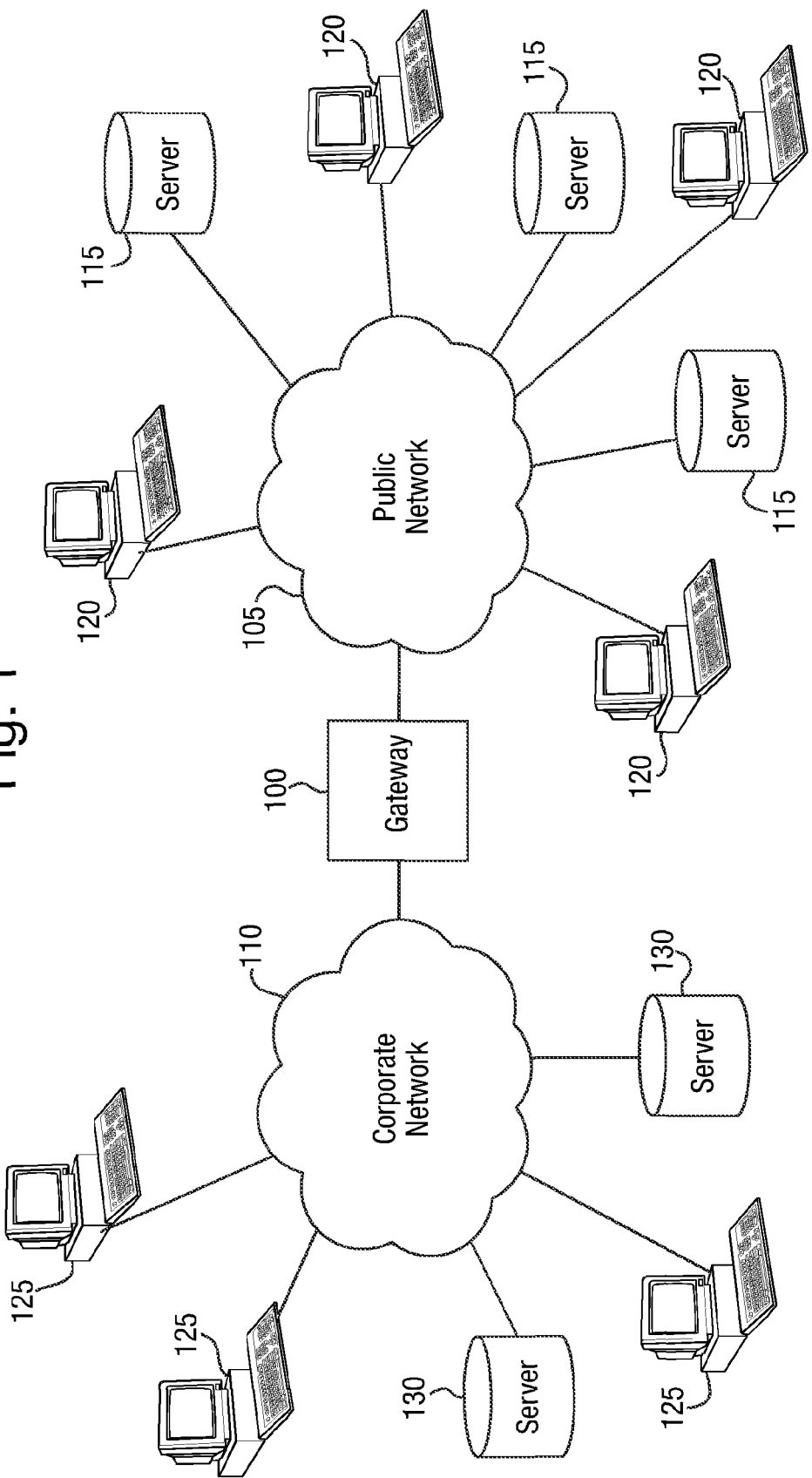
FIG. 1 shows a conventional arrangement whereby a network gateway is used to interconnect two data communications networks for the purpose of enabling and, optionally, limiting traffic flow between those networks according to predetermined criteria.

Referring firstly to FIG. 1, a conventional inter-network gateway 100 is shown providing an interface between a public network 105 and a corporate network 110. The public network 105 may be the public internet or another type of wide area network having a number of data servers 115 linked to it, accessible via user terminal equipment 120 running appropriate software (internet browser software for example) to enable users to search for and download data stored on those servers 115. Similarly, the corporate network 110 may have a number of examples of user terminal equipment 125, some being similar to that used to access the public network 105, and data servers 130 accessible to authorised users of that terminal equipment 125. Users of the corporate network 110 may access data servers 115 on the public network 105 via the gateway 100 for searching and downloading data, according to predetermined controls on data access and data transfer implemented on the gateway 100. Similarly, selected users (120) on the public network may be given access to certain data on corporate network servers 130, subject to an appropriate communications link, optionally encrypted, being established across the gateway 100.

The gateway 100 provides a convenient point at the edge of the corporate network 110 to implement a range of data transfer controls, such as conventional firewall software and hardware, virus checkers, and software to impose general restrictions on access to certain data servers 115 on the public network 105 according to corporate policy.

Preferred embodiments of the present invention allow for a different approach to data transfer between networks, facilitating and protecting a human decision making process relating to the transfer of data between networks, only intervening when appropriate.

To this end, and in summary, a first preferred embodiment of the present invention provides a system and method to enable a user to request the transfer of data from a data source linked to a first network, the public internet for example, to a recipient computing device linked to a second network, a corporate network for example, by means of an intermediate data transfer device that will be referred to hereafter as an "interactive content gateway". The data transfer request is made in two distinct stages. A first user interface is provided to enable the user to request the download of data over the first network from the data source to the interactive content gateway. A second user interface, executing in a separate computing environment to that of the first, and with no direct data link between those computing environments, enables the same user or a different user to request the transfer, over the second network, of downloaded data to the recipient device. Supervisory software is provided, running on the interactive content gateway, to monitor the requested data transfers and to trigger appropriate action in the event that a data transfer request by other than a human user is detected. Preferred implementations and variations of these features will now be described in more detail with reference to FIG. 2.

Figure 2:
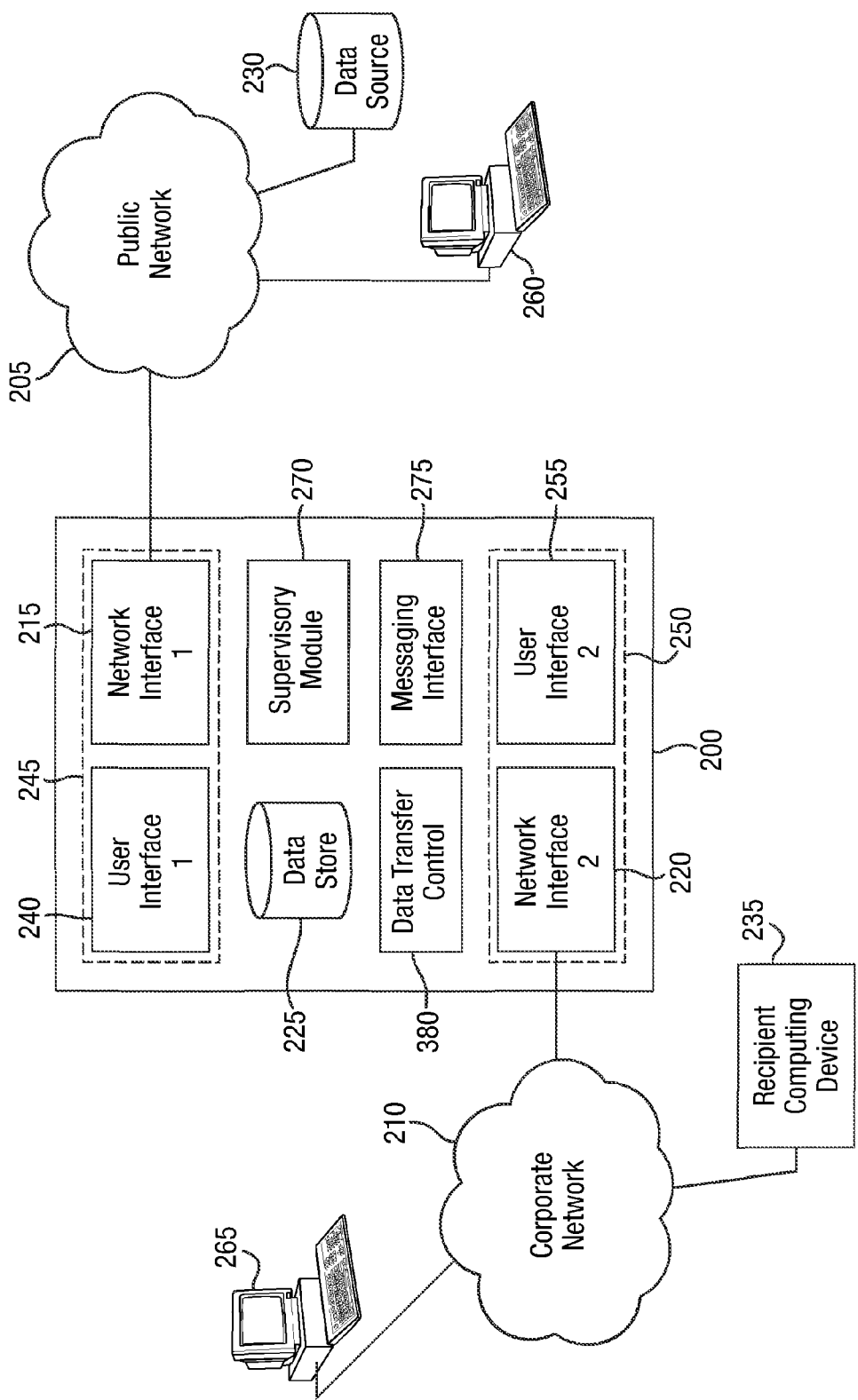
FIG. 2 shows a data transfer device providing an interface between two data communications networks according to a first preferred embodiment of the present invention.

Referring to FIG. 2, a preferred interactive content gateway 200 is shown interlinking a first network 205—the public internet for example—and a second network 210—a corporate network for example. To enable such an interlinking, the interactive content gateway 200 is provided with a first network interface 215 to the first network 205 and a second network interface 220 to the second network 210. A data store 225 is provided to store data downloaded from a data source 230 linked to the first network 205 and from which downloaded data may be transferred over the second network 210 to a recipient computing device 235. A first user interface software module 240 executes on the interactive content gateway 200 in a first virtual processing environment 245 shared with software implementing the first network interface 215. In a second, separate virtual processing environment 250, a second user interface module 255 executes, along with software implementing the second network interface 220, there being no direct data connection between the first and second virtual processing environments 245, 250. However, software executing in each of the first and second virtual processing environments 245, 250 may access the data store 225, in particular a respective virtualised instance of the data store 225, for the storage and retrieval of data. Such distinct virtual processing environments 245, 250 may be established by conventional virtualisation technologies, for example using software products such as VMware® (VMware Inc.) executing under an operating system such as Linux®, or by other known secure and high-assurance virtualisation technologies which operate directly with data processing hardware rather than through an operating system.

Preferably, a user may access the first user interface 240 by means of a first user computing device 260 linked to the first network 205, preferably but not necessarily over a secure connection established between the first user computing device 260 and the first network interface 215 on the interactive content gateway 200. For example, where the first network is an Internet Protocol (IP)-based network (as for the public internet), the connection may be implemented using the secure HTTP protocol under the control of conventional web browser software executing on the terminal device 260 such as Internet Explorer (Microsoft Corporation), Safari (Apple Inc.), FireFox (Mozilla Corporation) or Chrome (Google Inc.). The same user may access the second user interface 255 by means of a second computing device 265 linked to the second network 210 over an appropriate connection, not necessarily using a secure protocol, established with the second network interface 220. Further detail of preferred functionality provided by the first and second user interfaces 240, 255 will be apparent from the description that follows.

In an alternative implementation, the first and second user interfaces 240, 255 may be accessed from a single terminal device (not shown in FIG. 1) linked directly or indirectly to the interactive content gateway 200 as would be apparent to a person of ordinary skill in the relevant field. A single terminal device may provide, for example using virtualisation software, two distinct processing environments with one providing the functionality of the user terminal device 260 and the other providing the functionality of the user terminal device 265. The configuration of such a single terminal device would also need to ensure that the processing environment equivalent to the device 260 can communicate with the first user interface 240 but not the second, 255, and that the processing environment equivalent to the device 265 can communicate with the second user interface 255 but not the first, 240. Such a communications scheme may be provided using two separate physical or virtual connections, each linking the single terminal device to the respective network interface at the interactive content gateway 200. Preferably, by these means or by others, a user may request both the first and the second stages of a data transfer between a data source 230 and a recipient computing device 235 from the single physical computing device, as would be apparent to the above-mentioned person of ordinary skill in this field.

In a further preferred implementation of the first embodiment of the present invention, four or more distinct processing environments may be provided on a single physical computing device, each distinct processing environment hosting a different one of the first and second virtual processing environments 245, 250 of the interactive content gateway 200 and the functionality of the first and second user terminal devices 260, 265. In this way, a single user terminal device may be created to implement a new way of interfacing with external networks, with benefits both for the protection of the computing device itself and, if hosted on a corporate or other type of network, the integrity of that network too. Moreover, the single user terminal device may be an entirely self-contained device, e.g. a laptop of other mobile computing device, also incorporating the functionality of the receiving computing device 235 and having the benefit of access to both to the public network 205 and the corporate network 210. In use, such a device would provide a normal working computing environment for a user, implementing the functionality of the present invention when the user needs to transfer data between the public network 205 and a computing environment linked to the corporate network 210.

A supervisory software module 270 is provided, executing on the interactive content gateway 200 (or its implementation within a single computing device), arranged to receive details of data transfer requests from both the first and second user interfaces 240, 255 and arranged with access to the data store 225 to enable not only a user's data transfer requests to be analysed, but also any corresponding downloaded data. The supervisory module 270 may comprise sub-modules executing in each of the first and second virtual environments 245, 250, each sub-module having means for communicating with a common supervisory component (270). In this way, the supervisory module 270 may not only monitor details of data transfer requests but it may trigger alterations in the functionality of the first and/or the second user interfaces 240, 255, in the event that a potentially non-human data transfer request has been submitted, in particular to obtain additional verification of the user's credentials. The supervisory module 270 is arranged to maintain a log in the data store 225 of user data transfer requests and of the basis for any finding of potentially non-human behaviour. The supervisory module 270 may also be provided with access to a messaging interface 275 in order to alert a supervisory or administrative user to a detected event, or to obtain authorisation from such a user for a particular data transfer request. Preferred functionality of the supervisory module 270 may be summarised as follows:

(1) capture and analysis of a user's data transfer history over a period of time;

(2) derivation of metrics characterising a user's data transfer activity;

(3) comparison of metrics derived for a user's recent data transfer activity over a time period t with metrics derived for this user and/or other users over a longer time period T in order to detect divergent activity;

(4) detection of machine-generated rather than human-generated data transfer requests;

(5) generation of test scenarios for presentation via the first or second user interface 240, 255 to prompt a response likely to identify a user as human; and (6) detection of prohibited data types being requested or during transfer.

Preferably, data captured by the supervisory module 270 in (1) may include:

data representative of the content of data that a user has requested be transferred;

the time at which each data transfer request was made;

the claimed identity of the user requesting a transfer;

the type of data indicated by a user's data transfer request (e.g. "binary file", "image", "URL"); and metadata defining the software operating on the user's computing device 260, 265 from where the first or second stage transfer request was initiated (e.g. browser version, operating system version, etc.).

These data, or a subset of them, may be captured and represented as (potentially multi-dimensional) time series data over a given time period t (including or excluding data captured from a current data transfer request) and such data may be compared with time series data representing previous data transfers by this and/or by other users over a longer time period T. Alternatively, or in addition, time series data may be compared with other predetermined measures of valid human and non-human data transfer activity. Comparisons may be achieved using various known statistical or other comparison techniques, based for example upon geometrical ratios, arithmetic differences or vector cross-products, for comparing data sets. For example, the comparison techniques may include statistical measures such as diversity, autocorrelation or entropy and may also take into account the results of executing other types of algorithm on the data transferred according to previous user data transfer activity, such as natural language processing, image recognition or format comparisons.

From these comparisons the supervisory module 270 may determine a probability that the user's activity is divergent, representative of automated activity rather than human activity, and may trigger an appropriate response at the user interfaces 240, 255 in the event that the probability exceeds a predetermined threshold.

One example of a metric that may be used to distinguish automated activity from human activity is a measure of the average delay between a user's data download request at the first user interface 240 and a corresponding data transfer request at the second user interface 255 over a time period T. A statistically significant difference between the average delay over a recent time period t and the average over the longer time period T may indicate divergent behaviour, perhaps suggestive of automated submission of requests. Alternatively, or in addition, the variance in delay can be measured over a time period T and divergent behaviour may be indicated if a significantly reduced variance is observed over the shorter time period t in comparison with that more usually observed by this and/or by other users.

In a further metric, the type of data indicated in a data transfer request may be compared with the type of content actually being carried by the data being transferred. In particular, the type of data indicated in a request, at the first user interface 240, to download data from a data source 230 to the interactive content gateway 200 may be compared with the type of data indicated by an analysis of the content of the resultant downloaded data. Furthermore, the type of data indicated in a request, at the second user interface 255, to transfer downloaded data from the interactive content gateway 200 to the recipient computing device 235 may be compared with the type of data indicated by an analysis of the content of the downloaded data. Any discrepancy between the two may be subject to comparison with historical measures of the metric for the same or for different users.

In the event that the supervisory module 270 detects that a data transfer request or a recent series of data transfer requests are indicative of non-human activity, the supervisory module 270 may generate a challenge-response test at the second user interface 255 prior to implementing a requested transfer of data over the second network 210, assuming that a potential "attacker" would be accessing the data transfer functionality from the first network 205. The challenge-response test may require entry of data from a two factor authentication device that would be held by a human user to verify that they are whom they claim to be, or a prompt for the user to complete a two part "CAPTCHA" (Completely Automated Public Turing test to tell Computers and Humans Apart) or another known type of test designed to be difficult for a computer to respond to correctly. The received response to such a test is analysed by the supervisory module 270 to determine whether the response was provided by a legitimate human user and if this is the case, then to permit the requested transfer process to proceed without further interruption. Further information may be requested at one or other of the user interfaces 240, 255 or from a supervisory user if required to increase confidence in the authenticity of the user making the data transfer request.

Preferably, a number of such comparisons may be performed in parallel, using multiple different implementations of the techniques referenced above, for example using different statistical calculations or algorithms operating on a given set of captured data.

Preferably, the results of certain of the calculations above may be subject to comparison with predetermined norms or thresholds to determine whether they are indicative of activity that warrants intervention. Feedback may be provided by a supervisory or administrative user to enable such norms or thresholds to be updated to reduce the incidence of false alarm for a given user, a given set of users or a given network or for a particular operating situation, for example for particular dates and/or times of day, the type of data transfer, the type of computer system being used by the user to request and/or retrieve the transfer, or other aspects of the current operating situation.

In the event of any enduring doubt being highlighted regarding the authenticity of a user, the supervisory module 270 may establish contact with a predetermined supervisory or administrative user either to obtain their authorisation for the requested data transfer or for information only, providing details to such a user of the requested transfer and the basis for doubt as to the validity of the transfer request, as required.

The supervisory module 270 is closely coupled to or incorporated within functionality of a data transfer control module 280 arranged to implement overall control over the downloading of data to the gateway 200 and the transfer of data from the gateway 200 to a recipient device 235. The data transfer control module is arranged with access to resources available within the first and second virtual processing environments 245, 250, but its functionality is inaccessible to software executing in those first or second environments 245, 250. In particular, the data transfer control module 280 is responsive to receipt at the first or second user interfaces 240, 255 of data transfer requests to implement or trigger the requested data downloads and transfers. The data transfer control module 280 is also arranged to trigger the supervisory module 270, in the event of such requests being received, to operate as described above.

Whereas the first and second networks 205, 210 may be separate physical networks, one or both of them may be, alternatively, virtual networks implemented within a common network infrastructure. Similar functionality to that described above in the case of two physical networks may be applied to the case where one network is a physical network and one a virtual network, or where both are virtual networks.

Encryption or other software means may be used to maintain the separation of the two networks for the purposes of controlled data transfer, according to the present invention. The first and/or the second network interfaces 215, 220 may therefore be implemented as virtual network interfaces, as appropriate.

In the preferred embodiment described above with reference to FIG. 2, the interactive content gateway 200 as described may be implemented using a single physical computing device. However, it would be apparent to a person of ordinary skill in the relevant field that the functionality of the interactive content gateway 200 may be distributed across two or more separate physical computing devices with appropriate communications paths in place.

In a second preferred embodiment of the present invention, a more secure authentication arrangement is provided to ensure that a transfer of data from one network to another can only be authorised by a human user. A preferred implementation of this second embodiment will now be described with reference to FIG. 3.

Figure 3:
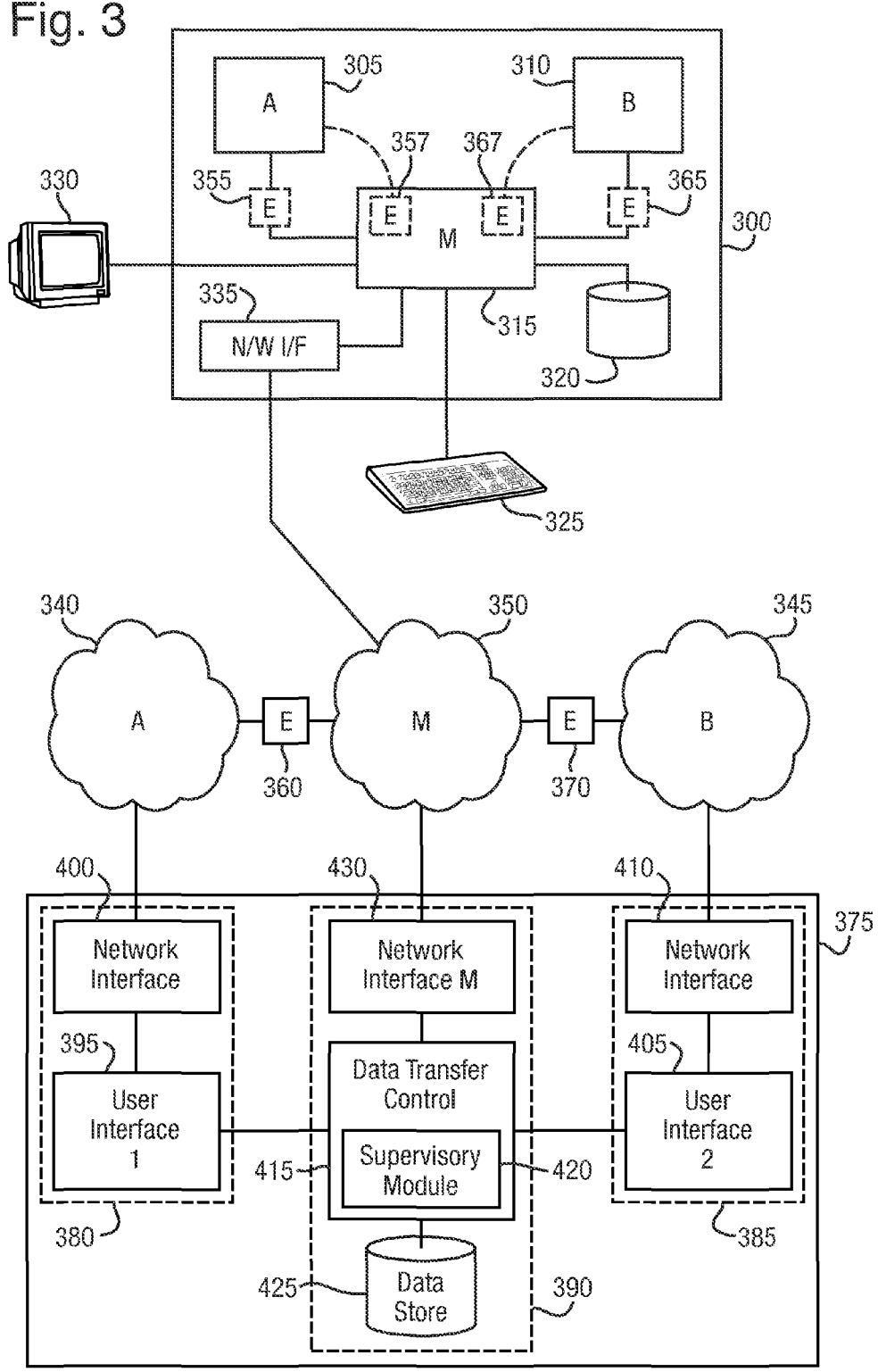
FIG. 3 shows a data transfer arrangement for providing an enhanced level of security and assurance in data transfers between networks according to a second preferred embodiment of the present invention.

Referring to FIG. 3, this more secure arrangement makes use of a further computing device 300 from which a user may arrange for data to be transferred between networks. This computing device 300 may take the place of the user terminal devices 260 and 265 in the first embodiment above (see FIG. 2) such that a single computing device is used to initiate all stages in a preferred data transfer process.

The computing device 300 may be any fixed or a mobile computing device on which virtualisation software may be installed and executed to provide three virtual computing environments 305, 310 and 315 labelled "A", "B" and "M" respectively in FIG. 3. The computing device may be a desktop computer, lap-top computer or another type of mobile computing device such as a "smart phone" or a computing "tablet", for example an iPad® device as supplied by Apple Corporation Inc. The environment M 315 is arranged in a controlling role to virtualise certain resources available within the computing platform such that different virtualised instances of those resources are accessible in each of the environments A 305 and B 310. For example, different virtualised instances of a hard disk 320, a keyboard 325, a display 330 and a network interface 335, each of which may be integral with the device 300 or locally connected to it as separate devices, may be generated and configured from the environment M 315 in each of the environments A 305 and B 310. To ensure a secure separation of the environments A 305 and B 310, the virtualisation software is arranged to ensure that virtualised resources accessible in the environment A 305 are inaccessible to software executing in the environment B 310, and vice versa. In particular, it is arranged that software executing in the environment A 305 is able to use the virtualised instance of the network interface 335 in the environment A 305 to connect only with a network A 340 (e.g. the Internet), and that software executing in the environment B 310 is able to use the virtualised instance of the network interface 335 in the environment B 310 to connect only with a network B 345 (e.g. a corporate network). Both of the environments A 305 and B 310 are isolated similarly from the environment M 315 so that software executing in either of the environments A 305 and B 310 is unable to access or to initiate communications with resources in the environment M 315. However, software executing in the environment M 315 is able to access virtualised resources in either of the environments A 305 and B 310 and to initiate communications with software executing in either of those environments 305, 310.

Software may be executed in the environment M 315 to communicate through the network interface 335 with a network M 350. The isolation provided by the virtualisation configuration described above prevents any software executing in the environment A 305 or B 310 establishing direct connections to the network M 350. However, the virtualisation configuration does enable, under the control of the environment M 315, communications between the environment A 305 and the network A 340 by means of an encrypted communications channel—a virtual tunnel—established between the environment A 305 and the network A 340 using a virtual private network (VPN) client encryption module 355 implemented on the device 300 and a VPN concentrator 360 deployed between the network M 350 and the network A 340. The communications path itself passes through the environment M 315, the network interface 335 and the network M 350. Similarly, an encrypted virtual tunnel may be established between the environment B 310 and the network B 345 to enable communications therebetween using a VPN client 365 implemented in the device 300 and a VPN concentrator 370 deployed between the network M 350 and the network B 345. In each case, the VPN clients 355 and 365 may optionally be implemented in software by encryption modules 357 and 367, respectively, executing in the environment M 315.

With the virtualisation configuration as described so far with reference to FIG. 3, the device 300 may be used to communicate separately and securely with resources connected to the networks A 340, B 345 and M 350. Such a device 300 may therefore support a number of different preferred data transfer processes initiated by an authorised user of the device 300, for example to implement the following.

A) Request a download of data from a source linked to a first network—the network A 340 or the network B 345—to an intermediate gateway device and then from the intermediate gateway device to a destination linked to a second network—the network B 345 or the network A 340 respectively.

B) Request a download of data from a source linked to the network A 340 or the network B 345 to an intermediate gateway device and then from the intermediate gateway device to a virtualised instance of the hard disk 320 of the device 300 accessible in the environment B 310 or the environment A 305 respectively.

C) Request a download of data from a virtualised instance of the hard disk 320 of the device 300 accessible in either the environment A 305 or the environment B 310 to an intermediate gateway device and then from the intermediate gateway device to a destination linked to either the network B 345 or the network A 340 respectively.

D) Request a download of data from a first virtualised instance of the hard disk 320 accessible in the environment A 305 to an intermediate gateway device and then from the intermediate gateway device to a second virtualised instance of the hard disk 320 accessible in the environment B 310, or vice versa.

In the first preferred data transfer process A), the device 300 may be used to initiate and validate a human request to transfer data between resources connected to the networks A 340 and B 345, separate from the device 300, making use of facilities provided by an interactive content gateway 375 having certain functionality in common with that (200) of the first embodiment described above. The device 300 would in this role take the place of the user terminal devices 260 and 265 of the first embodiment, above, but with additional functionality to provide a secure human user validation mechanism, as will be described below. A user is provided with authorised access to the environment A 305 and, separately, to the environment B 310 in order to make the data transfer requests.

The interactive content gateway device 375 comprises a computing platform on which virtualisation software may be executed to provide three virtual computing environments 380, 385 and 390. Software executing in the first environment 380 implements a first user interface 395 that may be accessed by means of a physical or virtual network interface 400 to the network A 340. Similarly, software executing in the second environment 385, isolated from the first environment 380, implements a second user interface 405 that may be accessed by means of a physical or virtual network interface 410 to the network B 345. A data transfer control module 415 is provided by software executing in the third environment 390, isolated from the first and second environments 380, 385, arranged to implement a two stage data transfer process similar to that implemented by the gateway 200 of the first preferred embodiment, with corresponding supervisory controls being provided by a supervisory module 420. The first and second user interfaces 395, 405 are provided with access to respective virtualised instances of a data store 425.

The virtualisation configuration of the three environments 380, 385 and 390 is such that the data transfer control module 415 is able to access resources within either of the other environments 380, 385, including the physical or virtualised network interfaces 400, 410, the virtualised instances of the data store 425 and signals or data made available by the first and second user interfaces 395, 405. This level of access enables the control module 415 to be responsive to and to implement data transfer requests received at those user interfaces 395, 405. In particular, the data transfer control module 415, including the supervisory module 420, is arranged to respond to the receipt of a request at the first user interface 395 to download data from a data source connected to the network A 340 to the gateway 375, to control and, if necessary, to implement that requested data download unless the supervisory module 420 detects anything to cause the download request to be denied.

When a request is received at the second user interface 405 to transfer the downloaded data from the gateway 375 to a destination connected to the network B 345, the supervisory module 420 establishes a communication channel with the computing device 300, in particular with human user validation software executing in the environment M 315 of that device 300, by means of a network interface 430 to the network M 350. The human user validation software is triggered by signals from the supervisory module 420 to prompt a user of the device 300 with access to the "destination" environment B 310 to enter a predefined key sequence, e.g. the Control-Alt Delete interrupt sequence, at the virtualised instance of the keyboard 325 available in the environment B 310 to verify that they are a human user of the device 300. Malicious software executing in either of the environments A 305 or B 310 would be unable to initiate such a communication with the human user validation software executing in the environment M 315 and would be unable to detect that such a key sequence had been entered in the other environment. This mechanism would therefore provide a good degree of confidence that the data transfer request was indeed initiated by a legitimate human user rather than by automated software. If the prompted key sequence is validly entered, then the validation software executing in the environment M 315 sends an acknowledgement message to the supervisory module 420 via the network M 350 and the data transfer control module 415 is triggered to implement the requested transfer of the downloaded data, unless the supervisory module 420 detects anything from its implementation of functionality corresponding to that described above for the supervisory module 270 to cause the data transfer request to be denied or, for example, be subject to a higher level of authorisation.

The specific conduct of the human user validation interaction may be controlled remotely by the supervisory module 420 in association with the human user validation software, or it may be triggered and conducted entirely under the control of the human user validation software itself. Preferably, the human user validation software may implement a time-out such that if a user fails to respond to a prompt from the human user validation software within a predetermined time period, then a non-human user will be assumed and a signal will be sent to the supervisory module 420 to suspend the requested data transfer.

Preferably, the request to download data to the interactive content gateway 375 originates with an authorised user of the device 300 using conventional web browser software executing in the environment A 305. The first user interface 395 is accessed by the user over a communications session established via the network A 340 with the interactive content gateway 375. Preferably the request to transfer the downloaded data is generated by a user (e.g. the same user) by means of conventional web browser software executing in the environment B 310. Communication with the second user interface 405 of the gateway 375 is by means of a communications session established via the network B 345.

In the event that a request to transfer data relates to a data source connected to the network B 345 and a destination device connected to the network A 340, then the requests to download data to the gateway 375 and to transfer it from the gateway 375 to a destination device are handled by the second (405) and first (395) user interfaces respectively. In that event, validation of the requesting user as a human user is effected by entry of a key sequence at a virtualisation of the keyboard 325 in the "destination" environment A 305.

In the second preferred data transfer process B), the same system architecture and configuration may be used as described for the process A) above and as shown in FIG. 3. An authorised user of the device 300, using conventional web browser software executing in the environment A 305, may establish a communications session via the network A 340 with the first user interface 395 of the interactive content gateway 375. The user may submit to the first user interface 395 a request to a download data from a source linked to the network A 340 to the intermediate gateway 375, which download is duly implemented under the control of the data transfer control module 415. The user may then submit a request from the "destination" environment B 310 to the second user interface 405, via the network B 345, to transfer the downloaded data from the intermediate gateway 375 to a respective virtualised instance of the hard disk 320 of the device 300 accessible in the environment B 310. On receipt of the data transfer request at the second user interface 405 the data transfer control module 415, in particular the supervisory module 420, triggers an equivalent user validation procedure via the network M 350 as for the first process A) prior to implementation of the requested data transfer (if not subject to denial or a further procedure triggered by the supervisory module 420). The validation key sequence to prove that a human user initiated the transfer of data is prompted for and then entered at a virtualised keyword 325 visible in the "destination" environment B 310.

An equivalent procedure is implemented to that for transfer between a source on the network A 340 and an instance of the hard disk 320 in the environment B 310, but beginning with a request from the environment B 310 to the second user interface 405 of the gateway 375 and being completed by a request from the "destination" environment A 305 to the first user interface 395. User validation in the environment M 315 follows an equivalent procedure to that for the process A), but with the validation key sequence to prove that a human user initiated the transfer of data being prompted for and then entered at a virtualised keyword 325 visible in the environment A 305.

In the third preferred data transfer process C), the data source may be either of a virtualised instance of the hard disk 320 accessible in the environment A 305 or B 310, and the destination may be linked to either the network B 345 or the network A 340 respectively. Therefore the request to download data from a respective virtualised instance of the hard disk 320 of the device 300 to the intermediate gateway 375 is initiated from the environment A 305 (to the first user interface 395) or B 310 (to the second user interface 405), whichever has access to the source data, and the request to transfer downloaded data to a destination linked to either the network B 345 or the network A 340 respectively would be initiated from the "destination" environment B 310 or A 305 having access to that destination network. User validation in the environment M 315 follows an equivalent procedure to that for the process A) with the validation key sequence to prove that a human user initiated the transfer of data being entered at a virtualised keyword 325 visible in the "destination" environment having access to the destination network.

In the fourth preferred data transfer process D), both the data source and the intended destination are within the device 300 itself, e.g. as different virtualised instances of the hard disk 320. Therefore, the request to download data from a source virtualised instance of the hard disk 320 is made from the environment (A 305 or B 310) hosting the source data and the request to transfer the downloaded data is made from the environment hosting the destination virtualised instance of the hard disk 320. Each request is submitted to whichever of the first or second (395, 405) user interface of the interactive gateway 375 that is accessible from the "source" environment (A 305 or B 310). User validation in the environment M 315 follows an equivalent procedure to that for the process A) with the validation key sequence being prompted for and then entered in the "destination" environment (B 310 or A 305 respectively).

Figure 4:
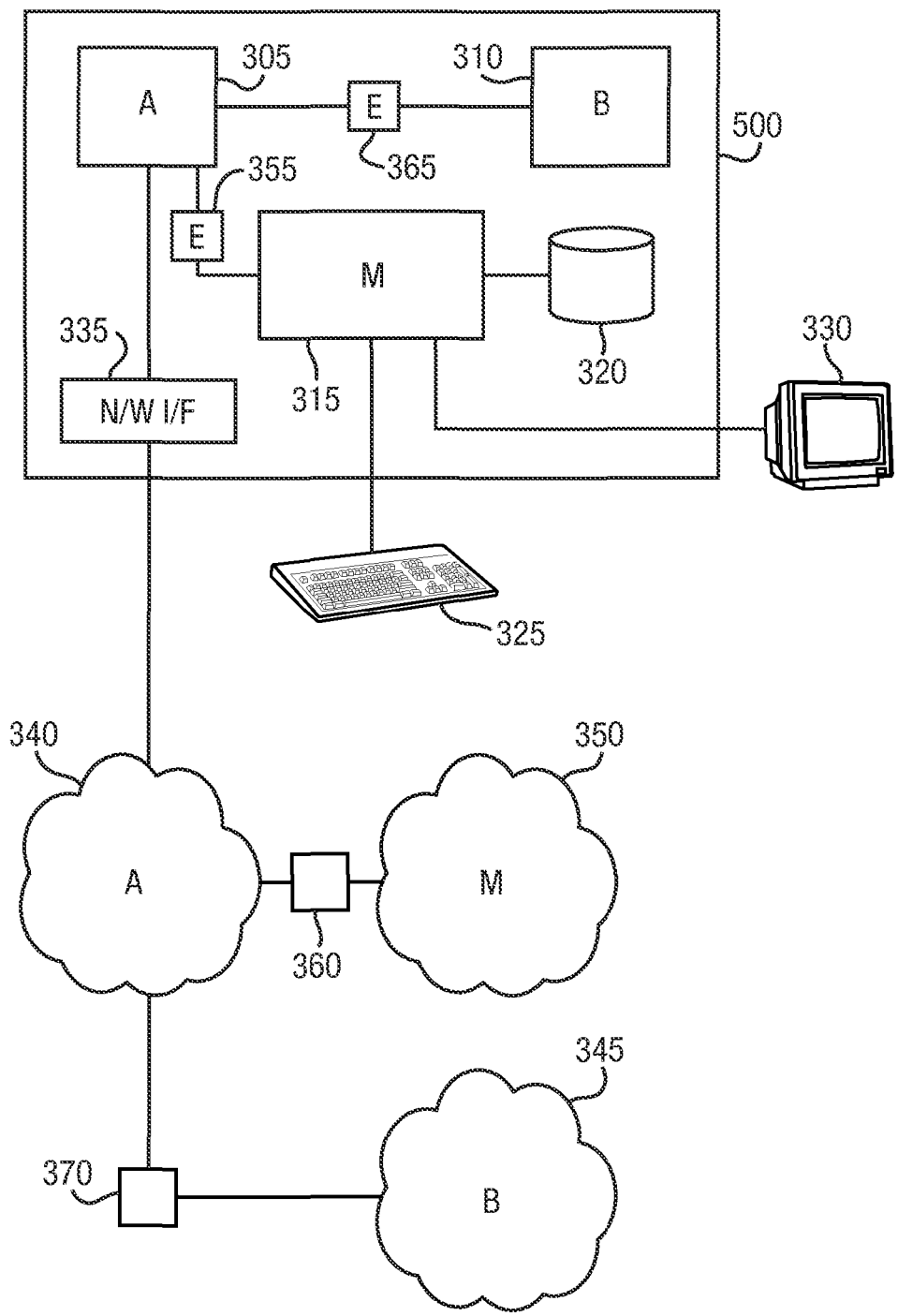
FIG. 4 shows a variation on the arrangement of FIG. 3 providing further increased security.

The functional capabilities of the device 300 may be implemented by a number of variants of the functional architecture described above with reference to FIG. 3, and in the particular choice of software and hardware selected to implement that functional architecture, as would be apparent to a person of ordinary skill in the relevant art. Of those potential variants to the device 300, one particularly preferred embodiment will now be described with reference to FIG. 4. In FIG. 4 the same reference numerals are used for functional features largely unchanged from the embodiment of the device 300 described above.

Referring to FIG. 4, a functional architecture is shown in which a device 500 is provided with the same three virtual environments A 305, B 310 and M 315 having the same qualities of separation of access between those environments as for the device 300. Virtualised instances of a hard disk 320, a keyboard 325, a display unit 330 and a network interface 335 may be made available. However, in the device 500 the network interface 335 is made directly accessible to the environment A 305, rather than to the environment M 315 as in the device 300. A virtualised instance of the network interface 335 is made available in the environment M 315 and in the environment B 310. Furthermore, the way in which virtual tunnels are established with the networks A 340, B 345 and M 350 is also different for the device 500. While software executing in the environment A 305 is able to access resources linked to the network A 340 directly, software executing in the environment M 315 is able to access the network M 350 only by means of a virtual tunnel established between a VPN client 355 linking the environment A 305 and the environment M 315 and a VPN concentrator 360 deployed between the network A 340 and the network M 350. Software executing in the environment B 310 is able to access the network B 345 by means of a virtual tunnel established between a VPN client 365 linking the environments A 305 and B 310 and a VPN concentrator 370 deployed between the network A 340 and the network B 345. The hard disk 320, the keyboard 325 and the display unit 330 may remain directly connected to the environment M 315 and virtualised in each of the environments A 305 and B 310 as for the device 300. However, despite these variations, once the architecture in FIG. 4 is implemented and an interactive content gateway (not shown in FIG. 4) is linked as in FIG. 3 to the networks A 340, B 345 and M 350, the functionality described above to implement four preferred data transfer processes A) to D) may be carried out using the architecture shown in FIG. 4, largely without variation.

The architecture of the device 500 of FIG. 4 provides certain advantages over that of the device 300 of FIG. 3. For example, the integrity of the environment M 315 is enhanced in the device 500 by linking the network interface 335 to the environment A 305 and by routing the virtual communications channels through the environment A 305.

Other variations would be apparent to a person of ordinary skill in the relevant art and such variations are intended to fall within the scope of the invention as now claimed. In particular, whereas the environment M 315 is shown in FIGS. 3 and 4 as a distinct computing environment within the device 300, in a typical implementation, the environment M 315 may comprise the operating system of the device 300, e.g. UNIX, and the virtual environments A 305 and B 310 are generated using virtualisation software executing in the environment M 315. Similarly, the resources of the device 300, including the data store 320, the keyboard 325, the display device 330 and the network interface 335 would be resources within the environment M and the virtualisation software would be configured to provide virtualised instances of each of these resources in each of the virtual environments A 305 and B 310 executing within the environment M 315.

In a preferred application of the data transfer apparatus of the present invention described above, reference is made for example to published patent applications WO 2006/131744, WO 2008/068450 of Glasswall Solutions Ltd describing techniques for regenerating a received file in an intended format as a means to avoid the spread of unwanted code and data. According to one such technique, a received file in a predetermined format is firstly parsed to determine whether its content conforms to that predetermined format and a new file is generated in the predetermined format using only the content found to be conformant. In a variant on that basic technique, a portion of the content of a received file may be parsed to determine whether it is passive content or active content. Any passive content found to conform to a predetermined file format may be used to regenerate the received file in the predetermined format, along with any active content deemed suitable for inclusion in the same or a separate regenerated file.

In practicing such techniques there remains the possibility that either (a) the regenerated file is missing some information which is of value to a user, or (b) the intended format of the received file cannot be discerned and hence the received file cannot be analysed and regenerated in an intended format. Controlled access to the originally received file may therefore be required during or following the file regeneration process and preferred embodiments of the present invention are able to provide that level of controlled access to the original file.

Referring in particular to FIG. 3, it is assumed that a user (for example of the device 300) is authorised to access the network A 340 and the network B 345 and that a file is to be transferred from a source linked to the network A 340 —to which it is also assumed that any remote attacker would also have access—to a destination linked to the network B 345, as in the first preferred data transfer process A) described above. In that process, the user may interact with the first user interface 395 on the gateway 375 to request the download of a file over the network A 340 to the gateway 375. Alternatively, the user may request download of a file attached to or linked to an e-mail, for example, accessible over the network A 340.

File regeneration functionality as described, for example, in the above-referenced patent applications of Glasswall Solutions Limited, may be implemented in software executing on the interactive content gateway 375, executing preferably in the third data processing environment 390 to process and regenerate a downloaded file such that the regenerated file is inaccessible to software executing in the first environment 380 or to a remote attacker over the network A 340. The original file and/or the original e-mail remains in the network A 340.

When the downloaded file has been regenerated, the user may submit a request to the second user interface 405 at the gateway 375 to transfer the regenerated file to a destination linked to the network B 345 or the file may be forwarded to the destination automatically by the gateway 375. If the original file was associated with an e-mail, software executing at the gateway 375 may re-assemble the originally received e-mail, including the regenerated file in place of an original attachment or replacing a link with one that points to the regenerated file on the gateway 375, making the e-mail available to the user for access over the network B 345. However, the regenerated file or the resulting output email (and associated attachment) may be different from the original for the reasons (a) and (b) above.

The gateway 375 is preferably arranged to implement means for associating a regenerated file or a reconstituted e-mail with the original file or e-mail that has been transferred or forwarded to the network B 345 so that they may be unambiguously related at some future time. Preferred means of association include:

insertion into a database of a record linking some unique aspect of the original file or email (e.g. a hash value of the original file or email) with some unique aspect of the regenerated file or e-mail (e.g. a hash value of the regenerated file or email);

if the original communication was an e-mail, insertion into both the original and reconstituted emails of metadata incorporating a unique reference number.

If, for the reasons (a) or (b) above, a user requires access to an original file which has been retained in the network A 340 then, as for the process A) above, the user may request a download of the original file to the gateway 375 (if not already cached there). Following validation as a human user and any other controls deemed necessary by the supervisory module 420, the user may request access either by viewing of the original file while it remains in the network A 340 from the restricted environment A 305, or by transferring it to a destination on the network B 345 or otherwise accessing it over the network B 345.

If the original file was associated with an e-mail, the user executes standard e-mail viewing software in order to view the reconstituted e-mail in the network B 345. However, in the event that the user wishes to gain access to the original e-mail, functionality is provided by software executing in the environment B 310 whereby information about the reconstituted email is communicated to the gateway 375 so that a retained association with the original e-mail may be recalled. This communication may be achieved for example by:

the gateway 375 inserting a link into the reconstituted e-mail before making it available in the network B 345 which, when clicked-on by the user, communicates the unique reference number of the e-mail to the gateway 375 using the hypertext transfer protocol (HTTP).

a software extension within the e-mail reading software providing a button which, when clicked, calculates a hash value of the reconstituted e-mail and communicates this to the gateway 375.

Either such communication, in particular to software executing in the second environment 385 of the gateway 375, from within the environment B 310 may be considered a request to initiate a transfer and may be processed by the data transfer control module 415 accordingly (for example, with the supervisory module 420 demanding a liveness test from the user over the network M 350 in order to complete the transfer if that is judged necessary). The data transfer control module 415 may provide user access to the original e-mail either over the network A 340 from within the environment A 305, or over the network B 345 from within the environment B 310 according to the perceived level of risk to the network B 345.

It would be apparent to a person of ordinary skill in the relevant art that there are a number of possible variations to the implementation of these ideas for file regeneration and viewing of an original file making use of apparatus as described in preferred embodiments of the present invention, at the same time adhering to the preferred principles of operation of such apparatus. Such variations are intended to fall within the scope of the present invention as claimed.

The invention claimed is:

1. An apparatus for controlling a transfer of data between data communications networks, the apparatus comprising:

a data store;

a first computer network interface for accessing a first data communications network and a first user interface for receiving a first data transfer request to download data from a data source linked to the first data communications network to the data store, in a first computing environment;

a second computer network interface for accessing a second data communications network and a second user interface for receiving a second data transfer request to transfer downloaded data from the data store to a recipient device linked to the second data communications network, in a second computing environment isolated from the first computing environment; and data transfer control processor comprising hardware with access to the first and second computing environments for controlling downloads and transfers of data according to the first and second requests, further comprising a supervisory processor configured to determine that at least the second request originates from a human user and, having so determined, to enable a data transfer according to the second request, the supervisory processor determining that the first or second request is by other than a human user when the first or second request is found to be statistically inconsistent, on the basis of one or more metrics derived from historical data characterizing data transfer requests by a respective user, with data characterizing human behavior, said one or more metrics being computed from data characterizing data transfer activity by the apparatus over a given time period.

2. The apparatus according to claim 1, wherein at least one of the first and second computing environments is a virtual network.

3. The apparatus according to claim 1, wherein said first and second computing environments are implemented using separate physical computing devices such that there is no direct data link between the first and the second computing environments and wherein the data transfer control processor, including the supervisory processor, are implemented within either a secure computing environment on the second physical computing device, or on a third physical computing device arranged with access to resources on the first and second computing devices, inaccessible from the first and second computing environments.

4. The apparatus according to claim 1, wherein the first and second computing environments comprise distinct virtual computing environments hosted on a single physical computing device, and wherein the data transfer control processor, including the supervisory processor, are implemented in a third computing environment hosted on said single physical computing device, the third computing environment being inaccessible from the first and second virtual computing environments.

5. The apparatus according to claim 1, wherein the supervisory processor is arranged to determine a probability that the first request or the second request originates from other than a human user and, in the event that the determined probability exceeds a predetermined threshold, to trigger one or more actions selected from:
at the second user interface, requesting a response designed to identify a user as a legitimate human user;
storing, in a log, details of a respective first or second request and an indication of the basis for recognizing a non-human request to transfer data;
communicating, to a supervisory user, details of the first or second request and an indication of the basis for recognizing a non-human request to transfer data; and
indicating, at the second user interface, that the second request has been denied and terminating the respective transfer of data.

6. The apparatus according to claim 1, wherein said one or more metrics are computed from time series data characterizing data transfer activity at the apparatus over a given time period and wherein the supervisory processor is arranged to compare said one or more metrics calculated from time series data characterizing data transfer requests attributable to a user over a time period t with respective metrics calculated from time series data characterizing data transfer requests attributable to the user, or data transfer requests of other users, over a longer time period T in order to detect divergent, non-human behavior.

7. The apparatus according to claim 6, wherein the time series data characterizing data transfer requests attributable to the user over a time period t include data characterizing a current first or second request attributed to the user.

8. The apparatus according to claim 6, wherein data characterizing data transfer requests attributable to a user include at least one type of data selected from:
data representative of the content of data that was the subject of a data transfer request;
the time at which each of a first or second request was made;
the claimed identity of a user attributed to a request to transfer data;
the type of data indicated by a first or second request; and
metadata indicative of the type of software operating on the computing device or in the computing environment from where a first or second request was initiated.

9. The apparatus according to claim 1, further comprising a file regeneration processor for regenerating a file of a predetermined format, downloaded to the data store, using content selected from the file, and wherein the data transfer control processor is arranged to make the regenerated file available for transfer to or access over the second network and, upon request, and subject to validation by the supervisory processor, to enable access to the downloaded file in the second network.

10. An apparatus for controlling access to data over a data communications network, the apparatus comprising:
in a first computing environment, a computer network interface to the data communications network and a first user interface for receiving a first data transfer request to download data from a data source linked to the network to a data store accessible in the first computing environment and, in a second computing environment isolated from the first computing environment, a second user interface for receiving a second data transfer request to access data downloaded to the data store;
data transfer control processor comprising hardware with access to the first and second computing environments for controlling the download of and access to data stored in the data store, further comprising a supervisory processor configured to determine that at least the second request originates from a human user and, having so determined, to enable a data transfer according to the second request, the supervisory processor determining that the first or second request is by other than a human user when the first or second request is found to be statistically inconsistent, on the basis of one or more metrics derived from historical data characterizing data transfer requests by a respective user, with data characterizing human behavior, said one or more metrics being computed from data characterizing data transfer activity by the apparatus over a given time period.

11. The apparatus according to claim 10, wherein the first and second computing environments comprise distinct virtual computing environments provided on a user computing device and wherein the data transfer control processor, including the supervisory processor, are implemented in a third computing environment provided on the user computing device, inaccessible from the first and second virtual computing environments.

12. The apparatus according to claim 11, further comprising file regeneration processor for regenerating a file of a predetermined format, downloaded to the data store, using content selected from the file, and wherein the data transfer control processor are arranged to make the regenerated file available for transfer to or access over the second network and, upon request, and subject to validation by the supervisory processor, to enable access to the downloaded file in the second network.

13. The apparatus according to claim 10, wherein the supervisory processor are arranged to determine a probability that the first request or the second request originates from other than a human user and, in the event that the determined probability exceeds a predetermined threshold, to trigger one or more actions selected from:
at the second user interface, requesting a response designed to identify a user as a legitimate human user;

storing, in a log, details of a respective first or second request and an indication of the basis for recognizing a non-human request to transfer data;

communicating, to a supervisory user, details of the first or second request and an indication of the basis for recognizing a non-human request to transfer data; and indicating, at the second user interface, that the second request has been denied and terminating the respective transfer of data.

14. The apparatus according to claim 13, wherein a first or second request by other than a human user is indicated when it is found to be statistically inconsistent, on the basis of one or more metrics derived from historical data characterizing data transfer requests by a respective user, with data characterizing human behavior.

15. The apparatus according to claim 14, wherein said one or more metrics are computed from data characterizing data transfer activity by the apparatus over a given time period.

16. The apparatus according to claim 15, wherein said one or more metrics are computed from time series data characterizing data transfer activity at the apparatus over a given time period and wherein the supervisory processor are arranged to compare said one or more metrics calculated from time series data characterizing data transfer requests attributable to a user over a time period t with respective metrics calculated from time series data characterizing data transfer requests attributable to the user, or data transfer requests of other users, over a longer time period T in order to detect divergent, non-human behavior.

17. The apparatus according to claim 16, wherein the time series data characterizing data transfer requests attributable to the user over a time period t include data characterizing a current first or second request attributed to the user.

18. The apparatus according to claim 16, wherein data characterizing data transfer requests attributable to a user include at least one type of data selected from:

data representative of the content of data that was the subject of a data transfer request;

the time at which each of a first or second request was made;

the claimed identity of a user attributed to a request to transfer data;

the type of data indicated by a first or second request; and metadata indicative of the type of software operating on the computing device or in the computing environment from where a first or second request was initiated.

19. A system for accessing, from a first network, data stored on a second network, the system comprising one or more user computing devices arranged with access to a gateway device;

the gateway device comprising:
a data store;
a first computer network interface for accessing a first data communications network and a first user interface for receiving a first data transfer request to download data from a data source linked to the first data communications network to the data store, in a first computing environment;
a second computer network interface for accessing a second data communications network and a second user interface for receiving a second data transfer request to transfer downloaded data from the data store to a recipient device linked to the second data communications network in a second computing environment isolated from the first coin computing environment; and data transfer control processor comprising hardware with access to the first and second computing environments for controlling downloads and transfers of data according to the first and second requests, further comprising a supervisory processor configured to determine that at least the second request originates from a human user and, having so determined, to enable a data transfer according to the second request; and the user computing device comprising:
a third computing environment;
a fourth computing environment inaccessible from the first computing environment;
a fifth computing environment inaccessible from the third and the fourth computing environments but arranged with access to one or more resources accessible to the third and fourth computing environments, provided with human user validation processor arranged to communicate over a secure communications link to a data transfer control processor of the gateway device; and
a network interface, configured to provide access to the first network from the third computing environment and to the second network from the fourth computing environment,
wherein a user with access to the third computing environment is arranged to communicate with a first user interface of the gateway device to request a download to the gateway device of data over the first network, and a user with access to the fourth computing environment is arranged to communicate with a second user interface of the gateway device to request a transfer of downloaded data from the gateway device over the second network, and wherein the human user validation processor is responsive to signals from the gateway device to implement at least a portion of a human user validation procedure at the user computing device.

20. The system according to claim 19, wherein the third and fourth computing environments comprise virtual computing environments provided within the fifth computing environment.

21. A method for controlling the transfer of data between a data source linked to a first data communications network and a recipient computing device linked to a second data communications network, comprising the steps:

(i) at a first user interface, receiving a first request to download data from the data source to an intermediate device over the first network;

(ii) at a second user interface, receiving a second request to transfer data downloaded to the intermediate device to the recipient computing device over the second network; and (iii) performing a supervisory step to determine that at least the second request originates from a human user and, having so determined, to enable a data transfer over the second network according to the second request, the supervisory step including determining that a data transfer request is by other than a human user when the data request is statistically inconsistent, on the basis of one or more metrics derived from historical data characterizing data transfer requests by a respective user, with data characterizing human behavior, the one or more metrics being computed from data characterizing data transfer activity over a given time period.

22. The method according to claim 21, wherein step (iii) comprises determining a probability that the first request or the second request originates from other than a human user, the method further comprising the step:

(iv) in the event that the determined probability at step (iii) exceeds a predetermined threshold, of triggering one or more actions selected from:

at the second user interface, requesting entry of information designed to identify a user as a legitimate human user;

storing, in a log, details of a respective first or second data transfer request and an indication of the basis for recognizing a non-human request to transfer data;

communicating, to a supervisory user, details of the first or second data transfer request and an indication of the basis for recognizing a non-human request to transfer data; and indicating, at the second user interface, that the second request has been denied and terminating the respective transfer of data.

23. The method according to claim 21, wherein a series of data transfer requests by other than a human user are indicated when they are found, at the supervisory step (iii), to be statistically inconsistent, on the basis of one or more metrics derived from historical data characterizing data transfer requests by a respective user, with data characterizing human behavior.

24. The method according to claim 23, wherein said one or more metrics are computed from data characterizing data transfer activity over a given time period.

25. The method according to claim 24, wherein said one or more metrics are computed from time series data characterizing data transfer activity over a given time period and wherein, at the supervisory step (iii), said probability is determined by comparing said one or more metrics calculated from time series data characterizing data transfer requests attributable to a user over a time period t with respective metrics calculated from time series data characterizing data transfer requests attributable to the user, or data transfer requests of other users, over a longer time period T to thereby calculate a probability of divergent, non-human behavior.

26. The method according to claim 25, wherein the time series data characterizing data transfer requests attributable to the user over a time period t include data characterizing a current first or second data transfer request attributable to the user.

27. The method according to claim 25, wherein said data characterizing data transfer activity attributable to a respective user include at least one type of data selected from:

data representative of the content of data that was the subject of a data transfer request;

the time at which each of a first or second data transfer request was made;

the claimed identity of a user attributed to a request to transfer data;

the type of data indicated by a first or second data transfer request; and metadata indicative of the type of software executing on a computing device or in a computing environment from where a data transfer request was initiated.

28. The method according to claim 22, including a feedback step by which a supervisory user may confirm or amend a result by the supervisory step (iii) thereby to modify calculations performed in respect of a particular user or in respect of particular operating conditions associated with that user.

29. The method according to claim 21, further comprising the step, in the event that the determined probability exceeds a predetermined threshold, issuing, by the second user interface, a challenge-response test designed to elicit an incorrect response if by other than a human user.

30. The method according to claim 29, wherein the challenge-response test is a CAPTCHA request or other form of Turing test.

31. A non-transitory computer readable medium comprising one or more executable software modules which when loaded and executed on a general purpose computer, or upon a distributed arrangement of computers, are arranged to perform the method steps of:

(i) at a first user interface, receiving a first request to download data from the data source to an intermediate device over the first network;

(ii) at a second user interface, receiving a second request to transfer data downloaded to the intermediate device to the recipient computing device over the second network; and (iii) performing a supervisory step to determine that at least the second request originates from a human user and, having so determined, to enable a data transfer over the second network according to the second request, the supervisory step including determining that a data transfer request is by other than a human user when the data request is statistically inconsistent, on the basis of one or more metrics derived from historical data characterizing data transfer requests by a respective user, with data characterizing human behavior, the one or more metrics being computed from data characterizing data transfer activity over a given time period.

32. A data carrier comprising a non-transitory computer-readable medium having stored thereon software code which when loaded and executed on a general purpose computer, or upon a distributed arrangement of computers, are arranged to implement the method steps of:

(i) at a first user interface, receiving a first request to download data from the data source to an intermediate device over the first network;

(ii) at a second user interface, receiving a second request to transfer data downloaded to the intermediate device to the recipient computing device over the second network; and (iii) performing a supervisory step to determine that at least the second request originates from a human user and, having so determined, to enable a data transfer over the second network according to the second request, the supervisory step including determining that a data transfer request is by other than a human user when the data request is statistically inconsistent, on the basis of one or more metrics derived from historical data characterizing data transfer requests by a respective user, with data characterizing human behavior, the one or more metrics being computed from data characterizing data transfer activity over a given time period.

* * * * *